3,736,342
PROCESS FOR PRODUCING
TRIALKOXYALUMINUM
Eiichi Ichiki, Kazuo Iida, Michio Kozai, and Yoshihiro Kondo, Niihama, Japan, assignors to Sumitomo Chemical Company, Limited, Higashi-ku, Osaka, Japan
No Drawing. Filed July 27, 1971, Ser. No. 166,630
Claims priority, application Japan, Aug. 18, 1970, 45/72,641
Int. Cl. C07f 5/06
U.S. Cl. 260—448 AD
14 Claims

ABSTRACT OF THE DISCLOSURE

A trialkoxyaluminum is produced from an alkylaluminum compound,

wherein $R_1$ and $R_2$ represent alkyl groups having 2 to 30 carbon atoms, and $R_3$ an alkyl or alkoxy groups having 2 to 30 carbon atoms through oxidation by contacting the alkylaluminum compound with a molecular oxygen-containing gas in a state of film having a thickness of not more than 5 mm., preferably not more than 3 mm., at $-20°$ to $150°$ C., preferably $0°$ to $100°$ C. under a pressure of not more than 50 kg./cm.$^2$ absolute, preferably 0.5 to 40 kg./cm.$^2$ absolute.

---

This invention relates to a process for producing a trialkoxyaluminum, and more particularly, the present invention relates to a process for producing trialkoxyaluminum by oxidizing an alkylaluminum compound.

The alkoxyaluminum compounds are very important precursors, because they are converted to useful alcohols as a solvent, plasticizer, detergent, lubricant, etc. by hydrolysis.

It is well known that an oxidation reaction of trialkylaluminum by molecular oxygen proceeds stagewise as shown below:

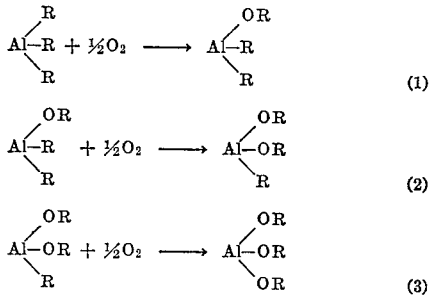

wherein Al represents aluminum, —R represents alkyl group, —OR represents an alkoxy group and $O_2$ represents molecular oxygen.

The reactions as represented by said Formulae 1 and 2 proceed very vigorously and release a large amount of heat. Unless the reactions are carried out under a controlled condition, the temperature is elevated and undesirable side reactions are ready to take place, whereby the alkyl groups are converted to olefins and paraffins.

On the other hand, the reaction represented by the Formula 3 proceeds very slowly, contrary to the reactions represented by the Formulae 1 and 2, and it is very difficult to complete the reaction and the undesirable side reactions are ready to take place, whereby the alkyl groups are converted to olefins and paraffins.

Therefore, when the reactions are carried out at a controlled temperature to prevent the side reactions taking place together with the reactions (1), (2) and (3), it is difficult to complete the reaction (3). On the other hand, when a higher temperature is employed to complete the reaction (3), the side reactions take place remarkably at the reactions (1), (2) and (3). That is, there has been a contradicting problem in carrying out the reactions.

To overcome such a problem, there have been so far proposed a process which comprises oxidizing the alkylaluminum compound with molecular oxygen diluted with a large amount of inert gas at the initial stage of the reaction, increasing an oxygen concentration of the gas with a progress of the reaction and using pure oxygen at the last stage of the reaction to complete the reaction (Japanese patent publication No. 9,881/58), and a process which comprises blowing an oxygen-containing gas into a mixture of at least 80% by weight of inert hydrocarbon and trialkylaluminum thereby to accelerate the reaction (U.S. Pat. No. 2,863,895).

However, the occurrence of the side reactions cannot be completely prevented and the reaction cannot be completed within a short time by either process. Furthermore in either process, there is such a disadvantage that the yield of trialkoxyaluminum cannot be made higher than 90%.

Under these situations, the present inventors have made various studies on a process for producing a trialkoxyaluminum by oxidizing an alkylaluminum compound with molecular oxygen, and as a result, the present inventors have found the following facts:

The monoalkoxydialkylaluminum formed according to the Formula 1 and the dialkoxymonoalkylaluminum formed according to the Formula 2 are very liable to be associated. Particularly, the dialkoxymonoalkylaluminum has such a remarkable tendency to be associated. When associated, the remaining unreacted alkyl groups of the resulting compounds are very difficult to be oxidized owing to the steric hindrance.

The monoalkoxydialkylaluminum and dialkoxymonoalkylaluminum are very liable to be oxidized before the association. That is to say, the oxidation reaction represented by the Formula 3 proceeds together with the association of the dialkoxymonoalkylaluminum, and therefore the oxidation must be carried out before the association of the dialkoxymonoalkylaluminum takes place. That is to say, the reaction represented by the Formula 3 can be readily carried out by oxidizing the alkylaluminum compound in a film state to convert it to trialkoxyaluminums.

However, these facts have not been so far recognized at all. In other words, the oxidation of an alkylaluminum compound is carried out in the prior art processes by charging the alkylaluminum compound into a vessel and blowing a molecular oxygen into the vessel. However, in the prior art processes, the association of dialkoxymonoalkylaluminum takes place before the reaction of the alkyl group and the molecular oxygen takes place, owing to a slow diffusion of the molecular oxygen, and therefore the reaction represented by the Formula 3 is retarded, which has been a cause for an impedance to the conversion.

The present invention has been accomplished on the basis of the foregoing findings.

That is to say, an object of the present invention is to provide a process for producing a trialkoxyaluminum from an alkylaluminum compound by contacting the alkylaluminum compound with a molecular oxygen-containing gas in a film state thereby to effect oxidation reaction.

The alkylaluminum compound used in the present invention as a starting material is represented by the following general formula,

wherein $R_1$ and $R_2$ represent alkyl groups having 2 to 30 carbon atoms and $R_3$ represents an alkyl group or alkoxy group of 2 to 30 carbon atoms.

Examples of the alkylaluminum compounds include tributylaluminum, tripentylaluminum, trihexylaluminum, trioctylaluminum, tridecylaluminum, tridodecylaluminum, trihexadecylaluminum, trioctadecylaluminum and the partially oxidized ones of these alkylaluminum compounds.

As the starting material, these alkylaluminum compounds can be used alone or in a mixture.

Further, the alkylaluminum compounds can be used in a single state, or in a state diluted with a solvent. However, it is desirable to use the alkylaluminum compounds in the state diluted with the solvent, because it is very easy to control the reaction temperature.

In carrying out the present process, it is essential to carry out the oxidation reaction by contacting the alkylaluminum compound with the molecular oxygen generally in a state of film having a thickness of less than about 5 mm., preferably less than about 3 mm. When the film thickness exceeds about 5 mm., the association of dialkoxymonoalkylaluminum proceeds in preference to the reaction of the alkylaluminum compound with the molecular oxygen, and consequently the oxidation reaction represented by the Formula 3 fails to proceed, and the conversion is lowered.

When the alkylaluminum compound is oxidized in such a film state through contact with the molecular oxygen, the oxidation reaction proceeds before the association of the dialkoxymonoalkylaluminum takes place, and therefore the reaction can be carried out in a short time. At the same time, the conversion can be considerably increased.

Furthermore, the removal of the heat of reaction can be readily carried out owing to the film state, and the occurrence of the side reactions can be considerably reduced. The reaction can be readily carried out in the film state by using a wetted wall type reactor, packed column-type reactor, rotating film type reactor, a reactor capable of extending a liquid to a reactor wall in a film state by a gas stream, etc. as a reactor.

As the molecular oxygen-containing gas, oxygen, oxygen gas diluted with inert gases such as nitrogen and argon, or hydrocarbons such as propane and butane, air or the like is used in the present invention. The molecular oxygen-containing gas can be passed through the reactor in parallel with or counter-currentwise to the flow of the alkylaluminum compound.

In the present invention, partial pressure of oxygen in the oxidation reactor is usually at least 0.1 kg./cm.² absolute, but when the partial pressure of oxygen is higher, the reaction can be effectively carried out in a shorter time, and therefore it is desirable to make the partial pressure of oxygen as high as possible.

The oxidation reaction can be carried out usually at a temperature of −20° to 150° C., but preferably at a temperature of 0° to 100° C. When the reaction temperature is less than −20° C., the reaction rate is lower, whereas when the reaction temperature exceeds 150° C., the side reactions take place. Therefore, the reaction temperature beyond the range of −20° to 150° C. is not preferable.

The oxidation reaction is usually carried out under not more than 50 kg./cm.² absolute. However, the productivity is lower under a pressure of about 0 kg./cm.² absolute, whereas when the reaction pressure exceeds 50 kg./cm.² absolute, a pressure vessel is required. Therefore, the oxidation reaction is desirable to carry out under a pressure of 0.5 to 40 kg./cm.² absolute.

The heat of reaction released by the oxidation reaction is removed by cooling the reactor from the outside by a cooling medium, or by mixing the alkylaluminum compound with a solvent in advance and utilizing the latent heat of evaporation of the solvent. Or, these procedures can be used together at the same time to remove the heat of reaction.

As the solvent to be mixed with the alkylaluminum compound to remove the heat of reaction, compounds having a boiling point of −50° to 150° C. and being substantially inert to the alkylaluminum compounds, for example, paraffins such as butane, pentane, hexane, heptane and octane; cycloparaffins such as cyclobutane, cyclopentane and cyclohexane; olefines such as butene, pentene, hexene and heptene; cycloolefins such as cyclohexene and cyclooctene; aromatic hydrocarbons such as benzene, toluene and xylene are used.

The thus obtained trialkoxyaluminum is an alkoxyaluminum compound having alkoxy groups corresponding to the alkyl groups of the starting material used, and is represented by the following general formula:

wherein $-OR_1$, $-OR_2$ and $-OR_3$ represent the alkoxy groups having 2–30 carbon atoms.

The examples of the thus obtained trialkoxyaluminum include tributoxyaluminum, tripentoxyaluminum, trihexoxyaluminum, trioctoxyaluminum, tridecyloxyalumium, tridodecyloxyaluminum, and trihexadecyloxyaluminum or their mixtures.

The thus obtained trialkoxyaluminum is then hydrolyzed, for example, with water, sulfuric acid, or sodium hydroxide thereby to produce the corresponding alcohol.

The thus obtained alcohol can be effectively utilized as a solvent, plasticizer, detergent, lubricant, etc.

According to the present invention as explained in detail above, the following remarkable advantages can be obtained:

(1) Considerably high conversion by oxidation can be attained.

(2) Occurrence of undesirable side reactions can be completely prevented.

(3) Time for oxidation reaction can be much shortened.

(4) Reaction conditions can be very readily controlled.

Now, the present invention will be explained, referring to examples, but the scope of the present invention is not limited to the examples.

EXAMPLE 1

A rotating film type reactor which comprised a glass pipe having an inner diameter of 15 mm. and a height of 1800 mm. and a Teflon rotating band having a width of 13 mm., the band being placed in the pipe and being rotated at 1550 r.p.m., was thoroughly flushed with dry air, and then a mixture consisting of 80.4% by weight of dry normal pentane and 19.6% by weight of tri-2-ethylhexylaluminum was charged into the reactor from the top of the reactor at a rate of 3.6 g./min. The mixture was made to a film having a thickness of about 1 mm. by the rotating band, and dry air was fed to the reactor countercurrentwise at a rate of 1 l./min., whereby the reaction was carried out. The outer wall of the reactor was kept constantly at 30° C. by circulating kerosene cooled at 30° C. through a jacket around the reactor. The residual gas from the reactor was separated from the solvent and by-products, entrained with the gas in a subcooler and purged under a control so that the pressure within the reaction system might be kept under the atmospheric pressure. The product liquid was continuously withdrawn from the bottom of the reactor and stored in a product liquid storage tank. After the reaction was brought into a stationary state, the hydrocarbons collected in the subcooler and the product liquid in the product liquid storage tank were all joined together and subjected to evaporative separation under vacuum. The resulting remaining liquid was hydrolized, and the thus obtained organic layer and the evaporated hydrocarbons as such were analyzed. It was found that 94.2% of the alkyl groups of the starting material alkylaluminum compound was converted to the alkoxyaluminum, 2.3% thereof to the paraffin and 0.6% thereof to the olefins, while 2.9% thereof was the unreacted alkyl groups.

EXAMPLE 2

After a wetted wall type reactor with a steel jacket having an inner diameter of 40 mm. and a height of 2500 mm. was thoroughly flushed with dry air, the pressure of the reaction system was increased to 7 kg./cm.$^2$ G, and a mixture consisting of 89.0% by weight of dry liquid mixture of butane-butene, and 11.0% by weight of a solution mixture consisting of 84.7% by equivalent of tri-2-ethylhexylaluminum, 6.3% by equivalent of tri-2-ethyl-4-methylpentylaluminum and 9.0% by equivalent of tri-2-methylhexylaluminum was fed to the reactor from the top of the reactor at a rate of 6.5 kg./hr. At the same time, dry air was fed thereto countercurentwise at a rate of 500 l./hr., and the reaction was carried out while purging the residual gas from the reactor through a subcooler so that the reaction system might be kept at 10 kg./cm.$^2$ G.

The outside wall of the reactor was kept constant at 20° C. by circulating kerosene cooled to 20° C. through the jacket of the reactor.

The product liquid was continuously withdrawn from the bottom of the reactor and stored in the product liquid storage tank. After the reaction was brought into a stationary state, the hydrocarbons collected in the subcooler were analyzed as such, and the product liquid in the product liquid storage tank was subjected to analysis after the liquid was separated into the hydrocarbons and alkoxyaluminum, by analyzing the separated hydrocarbons as such, but by hydrolyzing the alkoxyaluminum and analyzing the resulting organic layer. As a result, it was found that 96.0% of the alkyl groups of the starting material alkylaluminum compound was converted to alkoxyaluminum, 1.5% thereof to paraffins and 0.5% thereof to olefins, while 2.0% thereof was the unreacted alkyl groups.

EXAMPLE 3

A liquid-spray type packed column with a jacket having an inner diameter of 40 mm. and a height of 2500 mm. was packed with Helipack No. 3 (a trademark of packings made by Naniwa Co., Ltd., Japan), and was thoroughly flushed with a gas consisting of 20% by volume of oxygen and 80% by volume of propane. Then, a mixture of 85% by weight of dry toluene and 15% by weight of alkylaluminum obtained by ethylene growth reaction, having 12 carbon atoms on average and a Poisson distribution was fed to the reactor from the top thereof at a rate of 3.50 kg./hr. At the same time, a gas mixture of 20% by volume of oxygen and 80% by volume of propane was fed to the reactor countercurrent-wise at a rate of 1.5 m.$^3$/hr. The reaction was carried out in this manner. The outer wall of the reactor was kept constant at 30° C. by circulating kerosene cooled to 30° C. through the jacket around the reactor. The residual gas from the reactor was passed through a cooler, where the solvent and byproducts, entrained by the gas were separated, and then purged, while controlling the pressure of the reaction system so that it might be kept under the atmospheric pressure. The product liquid was withdrawn continuously from the bottom of the reactor and kept in a product liquid storage tank. After the reaction was brought into a stationary state, the products were analyzed in the same manner as in Example 1. It was found that 97.0% of octylaluminum of the starting material alkylaluminum compounds was converted to octoxyaluminum and 95.5% of hexadecylaluminum was converted to hexadetoxyaluminum, while the remainings were the byproducts, and the unreacted alkylaluminum compounds.

COMPARATIVE EXAMPLE

Into a liquid column, gas-blowing type reactor with a jacket having an inner diameter of 150 mm. and a capacity of 27.1 l. was fed a solution of 50% by weight of tri-2-ethylhexylaluminum and 50% by weight of heptane at a rate of 11 l./hr. At the same time, dry air was fed into the reactor from the bottom thereof at a rate of 1.53 Nm.$^3$/hr. The oxidation reaction was carried out in that manner. The reaction temperature was kept as 30° C. The liquid was withdrawn from the reactor, while keeping constant a liquid level in the reactor, and the gas was also withdrawn from the top of the reactor, while keeping the reactor under the atmospheric pressure. After the reaction was brought into a stationary state, the product liquid was analyzed. It was found that 77.8% of the alkyl groups of the alkylaluminum compound was converted to the alkoxy groups and 8.5% thereof to the paraffins and olefins, while there remained 13.9% of the unreacted alkyl groups. Then, the resulting alkylaluminum mixture was fed to a liquid column, gas-blowing type reactor provided with a stirrer, which had an inner diameter of 250 mm. and a capacity of 60 l., at a rate of 10 l./hr., and at the same time dry oxygen was fed into the reactor from the bottom thereof at a rate of 100 Nl./hr. The reaction temperature was kept at 30° C. The stirrer was of eight-stage turbine type. After the reaction was brought in a thoroughly stationary state with stirring at 95 r.p.m., the product liquid was sampled and analyzed. It was found that 81.2% of the starting material alkylaluminum compound was converted to the alkoxyaluminum, while the remaining was the byproducts, and the unreacted alkylaluminum compound.

It is seen from the foregoing examples and the comparative example that in the present invention a considerably higher conversion can be attained, as compared with the well-known processes, and the oxidation can be carried out in a shorter time with very less occurrence of the side reactions.

What is claimed is:

1. A process for producing a trialkoxyaluminum from an alkylaluminum compound, which comprises contacting a film of an alkylaluminum compound having a thickness of not more than 5 mm. with a molecular oxygen-containing gas, thereby to oxidize the alkylaluminum compound.

2. A process according to claim 1, wherein the film has a thickness of not more than 3 mm.

3. A process according to claim 1, wherein the alkylaluminum compound is diluted with a solvent.

4. A process according to claim 3, wherein the solvent is a compound having a boiling point of —50° to 150° C. and being substantially inert to the alkylaluminum.

5. A process according to claim 4, wherein the solvent is butane, pentane, hexane, heptane, octane, cyclobutane, cyclopentane, cyclohexane, butene, pentene, hexene, heptene, cyclohexene, cyclooctene, benzene, toluene and xylene.

6. A process according to claim 1, wherein the alkylaluminum compound is a compound having the formula,

wherein $R_1$ and $R_2$ represent alkyl groups having 2 to 30 carbon atoms, and $R_3$ represents an alkyl or alkoxy group having 2 to 30 carbon atoms.

7. A process according to claim 6, wherein the alkylaluminum compound is tributylaluminum, tripentylaluminum, trihexylaluminum, trioctylaluminum, tridecylaluminum, tridodecylaluminum, trihexadecylaluminum, trioctadecylaluminum or partially oxidized ones of said alkylaluminum compounds.

8. A process according to claim 7, wherein the alkylaluminum compound is used alone or in a mixture.

9. A process according to claim 1, wherein the molecular oxygen-containing gas is oxygen; oxygen diluted with nitrogen, argon, propane or butane; or air.

10. A process according to claim 1, wherein the oxygen is under a partial pressure of at least 0.1 kg./cm.$^2$ absolute.

11. A process according to claim 1, wherein the oxidation is carried out at a temperature of $-20°$ to $150°$ C.

12. A process according to claim 11, wherein the oxidation is carried out at a temperature of $0°$ to $100°$ C.

13. A process according to claim 1, wherein the oxidation is carried out under a pressure of not more than 50 kg./cm.$^2$ absolute.

14. A process according to claim 11, wherein the oxidation is carried out under a pressure of 0.5 to 40 kg./cm.$^2$ absolute.

References Cited

UNITED STATES PATENTS

| | | | |
|---|---|---|---|
| 3,455,978 | 7/1969 | Richardson et al. | 260—448 AD |
| 3,395,166 | 7/1968 | Johnson | 260—448 A |
| 2,892,858 | 6/1959 | Liegler | 260—448 AD |
| 2,863,895 | 12/1958 | Kirshenbaum | 260—448 AD |

HELEN M. S. SNEED, Primary Examiner